United States Patent
Li et al.

(10) Patent No.: US 8,643,656 B2
(45) Date of Patent: Feb. 4, 2014

(54) ENERGY-AWARE TASK CONSOLIDATION ON GRAPHICS PROCESSING UNIT (GPU)

(75) Inventors: Dong Li, Blacksburg, VA (US);
Surendra Byna, Princeton, NJ (US);
Srimat Chakradhar, Manalapan, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 329 days.

(21) Appl. No.: 13/227,865

(22) Filed: Sep. 8, 2011

(65) Prior Publication Data

US 2012/0081373 A1 Apr. 5, 2012

Related U.S. Application Data

(60) Provisional application No. 61/388,259, filed on Sep. 30, 2010.

(51) Int. Cl.
*G06F 15/00* (2006.01)
*G06T 1/00* (2006.01)
*G06F 9/46* (2006.01)

(52) U.S. Cl.
USPC .......................................... 345/501; 718/100

(58) Field of Classification Search
USPC .......................................... 345/501; 718/100
See application file for complete search history.

(56) References Cited

U.S. PATENT DOCUMENTS

| | | | | |
|---|---|---|---|---|
| 8,284,205 | B2 * | 10/2012 | Miller et al. | 345/502 |
| 2005/0049729 | A1 * | 3/2005 | Culbert et al. | 700/50 |
| 2007/0220291 | A1 * | 9/2007 | Stufflebeam | 713/320 |
| 2008/0204460 | A1 * | 8/2008 | Marinkovic et al. | 345/502 |
| 2009/0167770 | A1 * | 7/2009 | Navale et al. | 345/501 |

OTHER PUBLICATIONS

Guevara et al,. "Enabling Task Parallelism in CUDA Scheduler" Proceedings of the Workshop on Programming Models for Emerging Architectures, Sep. 2009. (8 pages).

* cited by examiner

*Primary Examiner* — Jacinta M Crawford
(74) *Attorney, Agent, or Firm* — Joseph Kolodka

(57) ABSTRACT

A method includes configuring a shared library, stored in a memory, to be loaded into applications to intercept graphics processing unit (GPU) computation requests for different types of workload kernals corresponding to the applications. The method further includes generating a power prediction and a performance prediction for at least one candidate kernel combination for execution on a GPU responsive to the GPU computations requests. The at least one candidate kernel combination pertains to at least two of the workload kernals. The method also includes rendering a decision of whether to execute the at least one candidate kernel combination or to execute the at least two of the workload kernals pertaining thereto separately, based on the power prediction and the performance prediction.

20 Claims, 7 Drawing Sheets

ENERGY-AWARE TASK CONSOLIDATION ON GRAPHICS PROCESSING UNIT (GPU)

RELATED APPLICATION INFORMATION

This application claims priority to provisional application Ser. No. 61/388,259 filed on Sep. 30, 2010, incorporated herein by reference.

BACKGROUND

1. Technical Field

The present invention relates to graphics processing, and more particularly to energy-aware workload consolidation on a graphics processing unit (GPU).

2. Description of the Related Art

Heterogeneous clusters, which have diverse computing components to provide domain-specific accelerations, can provide substantial improvement in performance or energy-efficiency. Investigating how to optimize the usage of computing components is vital to leverage a heterogeneous cluster.

A general purpose graphics processing unit (GPGPU) is an important computing component for the state-of-art heterogeneous cluster. There are many reports about using a GPU to achieve great performance speedup for data parallel applications, such as support vector machine (SVM) training (172X) and the K-nearest neighbor algorithm (470X). However, some applications do not achieve good speedup on the GPU and only have comparable or even worse performance than a CPU. Enterprise workloads such as search, data mining and analytics, and so forth are examples of such workloads that typically involve a large number of users who are simultaneously using applications that are hosted on clusters of commodity computers. The execution time of these kernels is either comparable or in some cases more than the execution time on a multicore CPU. For example, GPU performance (NVIDIA Tesla C1060) of an encryption workload with an input file of 12 KB performs 18.33% worse than a CPU (Intel Xeon E5520 Quad-core). A sorting workload with 6144 input elements is only 3.69× faster on the GPU than on the CPU. The main reason for this poor performance on the GPU is due to low GPU hardware resource utilization. GPU computation power is thus not fully leveraged. The encryption workload mentioned above uses only 3 streaming multiprocessors (SMs). The sorting workload uses only 6 SMs. A typical GPGPU consumes more than 200 W at peak, about twice more than the peak power requirement of a CPU. Running those applications with low hardware utilization on power-hungry GPUs is not energy efficient.

There are other scenarios where GPU resources are unevenly utilized. For example, an encryption workload with an input file of 184 KB uses 45 thread blocks. These blocks could be unevenly distributed on a GPU, such as a Tesla C 1060 with 30 SMs. Lightly-loaded SMs finish earlier and have to wait for the remaining SMs to finish. These lightly-loaded SMs will stay active even while doing nothing on a modern GPU that does not support clock gating. These SMs can be released by the applications and stay idle, which waste energy.

Given a batch of workload instances run on a GPU whose execution configurations are fixed, a recent study establishes that consolidating computation workload of multiple kernels is beneficial. Here, workload consolidation refers to merging multiple workloads (either homogeneous, i.e., the same workloads with different input data; or heterogeneous, i.e., different workloads with different input data) to concurrently execute on a GPU. The workload consolidation is different from multi-kernel execution feature offered by NVIDIA's Fermi GPU architecture. For example, regarding Fermi GPUs, while multiple kernels can run on Fermi GPUs, they have to belong to the same context.

One prior art approach demonstrated the performance benefit of merging two workloads into one kernel. Their decision to merge workloads is based on whether each kernel has enough data parallelism to fully utilize GPU resources. While this basic decision making criterion is valid, there are many other reasons for losing performance with task consolidation. Consolidation has the risk of losing performance due to the contention of shared resources, such as GPU global memory bandwidth, shared memory, register file, and constant memory. Moreover, any two or more underutilized workloads cannot be merged due to increased power requirement of the consolidated kernel. Since energy consumption is the product of power and execution time, the performance improvement must be high enough to achieve energy efficiency. To verify whether a consolidated workload is energy efficient or not, one has to develop the code for consolidated workload and execute the code on a GPU.

SUMMARY

These and other drawbacks and disadvantages of the prior art are addressed by the present principles, which are directed to energy-aware workload consolidation on a graphics processing unit (GPU).

According to an aspect of the present principles, there is provided a method. The method includes configuring a shared library, stored in a memory, to be loaded into applications to intercept graphics processing unit (GPU) computation requests for different types of workload kernals corresponding to the applications. The method further includes generating a power prediction and a performance prediction for at least one candidate kernel combination for execution on a GPU responsive to the GPU computations requests. The at least one candidate kernel combination pertains to at least two of the workload kernals. The method also includes rendering a decision of whether to execute the at least one candidate kernel combination or to execute the at least two of the workload kernals pertaining thereto separately, based on the power prediction and the performance prediction.

According to another aspect of the present principles, there is provided a system. The system includes a call interceptor having a memory. The memory has a shared library stored therein. The shared library is configured to be loaded into applications to intercept graphics processing unit (GPU) computation requests for different types of workload kernals corresponding to the applications. The system further includes a consolidator configured to generate a power prediction and a performance prediction for at least one candidate kernel combination for execution on a GPU responsive to the GPU computations requests. The at least one candidate kernel combination pertains to at least two of the workload kernals. A decision is provided by the consolidator of whether to execute the at least one candidate kernel combination or to execute the at least two of the workload kernals pertaining thereto separately, based on the power prediction and the performance prediction.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
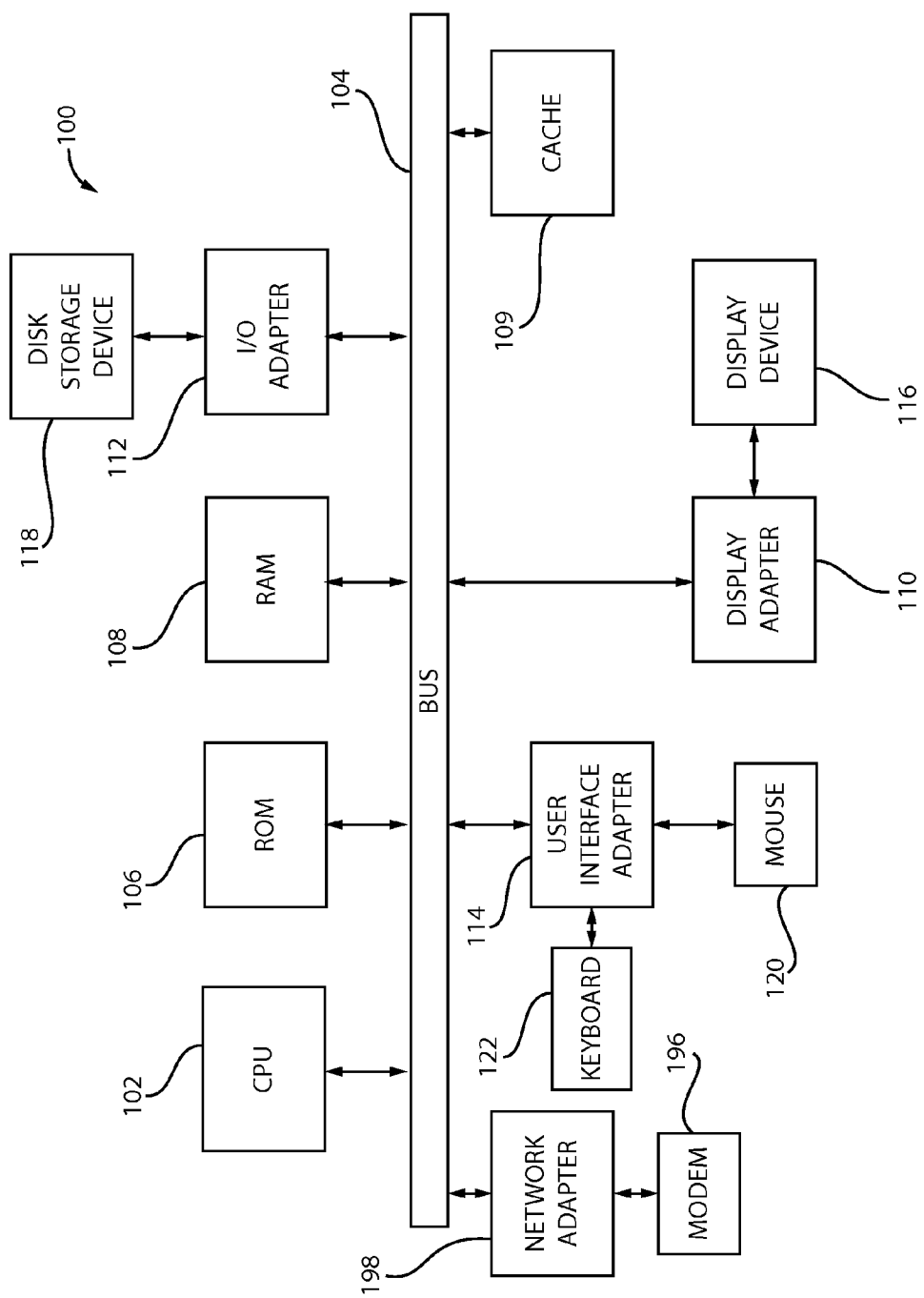
FIG. 1 is a block diagram illustrating an exemplary processing system 100 to which the present principles may be applied, according to an embodiment of the present principles.

As noted above, the present principles are directed to energy-aware task consolidation on a graphics processing unit (GPU).

Graphics processing units (GPUs) typically achieve high performance when a workload is highly data parallel. However, there are many workloads that do not utilize the full potential of GPU computing and memory resources and perform poorly compared to running them on a multicore CPU. Although the GPU does not provide acceleration for these workloads, and the power consumption of a GPU is much higher than a multicore CPU, we show that new GPU work consolidation strategies that take into account the energy consumption can result in an order of magnitude savings in energy over multicore CPUs. We develop a framework that dynamically consolidates different types of workloads in GPU computation requests into a single GPU workload. However, arbitrary consolidation of GPU workloads does not always lead to better energy efficiency. Work consolidation increases power consumption on the GPU, and an overall energy saving is only possible when the execution time of the consolidated workload decreases adequately to offset the increase in power consumption. We use GPU performance and energy models to predict the energy consumption of potential workload consolidation alternatives, and identify useful consolidations. The decision to consolidate is made before developing consolidated kernel code. We evaluate our framework on a variety of workload kernels that either perform poorly or marginally better on the GPU. Our experiments on a variety of workload kernels (that perform poorly on a GPU) show that the proposed framework for GPU can provide a 2× to 23× energy benefit over a multicore CPU.

Thus, we consider consolidating kernels from different contexts and merging the work of the kernels into one large kernel. Note that workload consolidation may increase the latency for an individual kernel, but it has the potential of improving the throughput (the number of workload instances processed per second) and energy efficiency (energy consumed per workload instance).

Hence, in an embodiment, we propose a GPU power prediction model that captures power-critical events. By assuming a "virtual" streaming multiprocessor (SM), the model can predict GPU power consumption, even though SMs have variant power consumption.

Moreover, in an embodiment, we develop a GPU performance prediction model that estimates GPU performance, even though different SMs execute different types of workloads. Our model also considers scheduling orders of heterogeneous warps scheduled into the same SM. As used herein, a warp refers to a batch of threads that are executed together by hardware (e.g., a GPU).

In our evaluations, we have used NVIDIA Tesla C1060 GPU and CUDA programming. These GPUs include a number of streaming multiprocessors (SMs) and each SM includes a number of symmetric processors (SPs). The C1060 GPU has 30 SMs, each including 8 SPs. These GPUs also include special function units (SFUs), shared memory, constant memory, and global memory. Of course, the present principles are not limited to the preceding GPUs and, thus, may be applied to other GPUs. Moreover, the present principles are not limited to CUDA programming and, thus, may be applied to other types of programming.

Compute Unified Device Architecture (CUDA) programs are written as kernels and called from host processes running on CPUs. CUDA threads have a three level hierarchy as follows: grids; blocks; and threads. Each grid includes a set of blocks of threads and each block includes hundreds of threads. It is the responsibility of a programmer to specify the number of threads in a block and the number of blocks in a grid.

Blocks of threads are serially distributed to all the SMs. All the threads in one block will be executed on the same SM. Each SM launches warps of 32 threads. Hence, a block will be divided into some number of warps if the number of threads in a block is more than 32. Since all the threads share the registers and shared memory within an SM, the number of blocks that can be scheduled on one SM is limited by the usage of registers and shared memory. All threads in a warp execute the same instruction when the warp is selected for execution. A warp scheduler schedules warps onto SMs as they are ready to run. Since a warp cannot execute while waiting for data from memory, multiple warps can be scheduled on an SM to hide the memory latency. Since SMs are assigned to blocks in a round-robin fashion, if there are fewer blocks than the number of SMs, then some SMs are idle. If the number of blocks is not divisible by the number of SMs, then the workload on some SMs will be higher than the others.

Referring now in detail to the figures in which like numerals represent the same or similar elements and initially to FIG. 1, an exemplary processing system 100 is shown to which the present principles may be applied, in accordance with an embodiment of the present principles. The processing system 100 includes at least one processor (CPU) 102 operatively coupled to other components via a system bus 104. A read only memory (ROM) 106, a random access memory (RAM) 108, a display adapter 110, an I/O adapter 112, a user interface adapter 114, and a network adapter 198, are operatively coupled to the system bus 104.

A display device 116 is operatively coupled to system bus 104 by display adapter 110. A disk storage device (e.g., a magnetic or optical disk storage device) 118 is operatively coupled to system bus 104 by I/O adapter 112.

A mouse 120 and keyboard 122 are operatively coupled to system bus 104 by user interface adapter 114. The mouse 120 and keyboard 122 are used to input and output information to and from system 100.

A (digital and/or analog) modem 196 is operatively coupled to system bus 104 by network adapter 198.

Of course, the processing system 100 may also include other elements (not shown), including, but not limited to, a sound adapter and corresponding speaker(s), and so forth, as readily contemplated by one of skill in the art.

Figure 2:
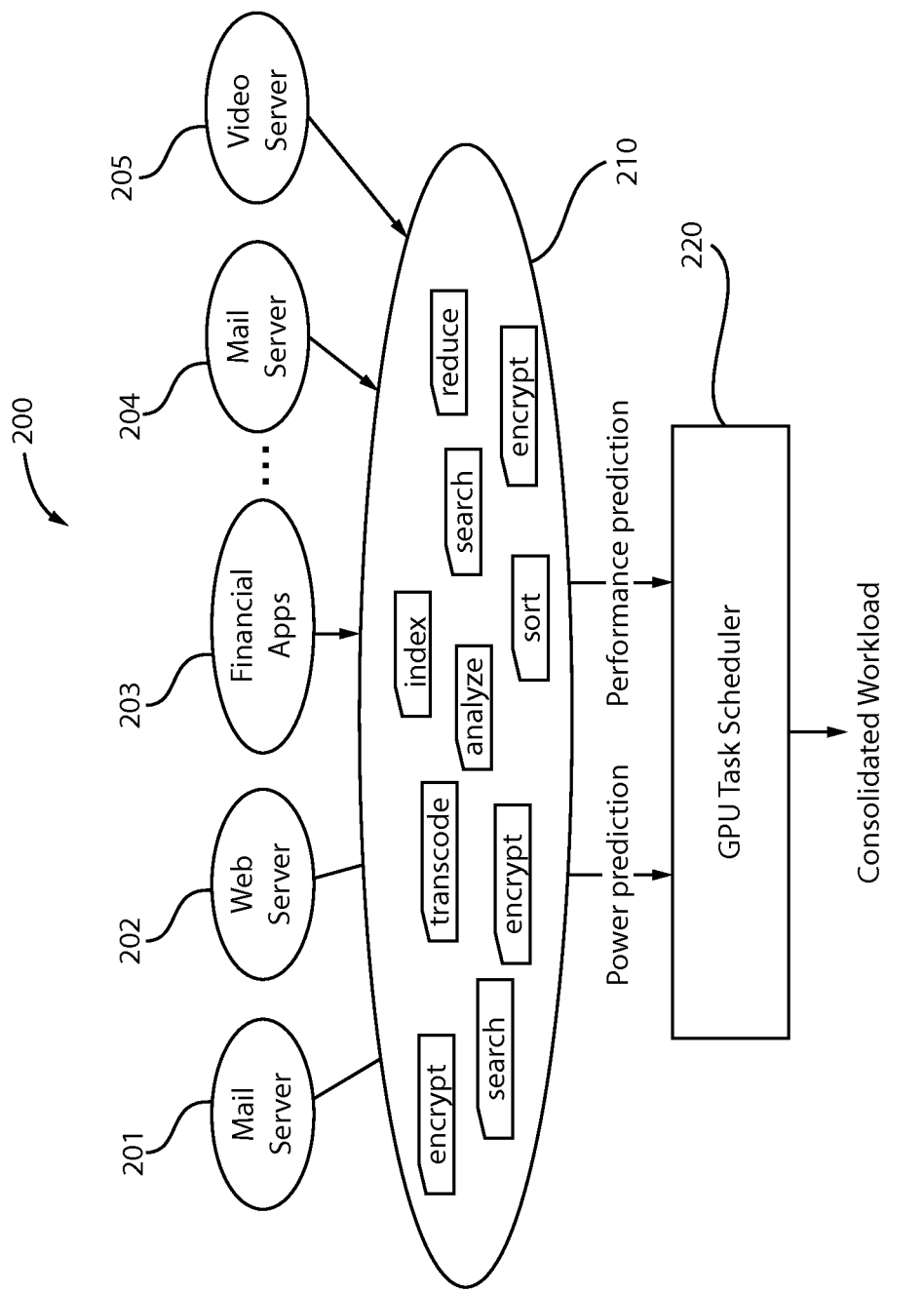
FIG. 2 shows an exemplary environment 200 to which the present priniciples may be applied, in accordance with an embodiment of the present principles.

FIG. 2 shows an exemplary environment 200 to which the present priniciples may be applied, in accordance with an embodiment of the present principles. The general goal of the present principles is to determine the optimal GPU workload consolidation, so that GPU energy efficiency and system throughput are improvided. The environment 200 may include one or more of the following: a mail server 201; a web server 202; financial applications (apps) 203; another mail server 204; and a video server 205. A power prediction and a performance prediction are determined, based on a batch of wordloads 210 pending for one or more of elements 201 through 205. The workloads may include, for example, functions such as encrypt, transcode, analyze, index, search, reduce, and sort, as shown. Of course, other types of workloads may also be utilized, while maintaining the spirit of the present principles.

The power prediction and the performance prediction are provided to a GPU task scheduler 220. The GPU task scheduler 220 then provides an optimal GPU wordload consolidation based on the power prediction and the performance prediction.

The present principles use an energy efficiency policy to verify the consolidation performance and power consumption without the actual execution. The performance prediction is based on an analytical performance model that captures the important performance bottlenecks on computation and memory access parallelism. The power prediction is based on a statistical linear regression method that builds the relationship between the estimated system components access intensity and GPU dynamic power consumption. After the performance and power analysis, it is determined whether the workload consolidation is beneficial in terms of energy efficiency and performance. If both the power prediction model and the energy efficiency model predict that consolidation is beneficial, then the consolidated kernal code is written. The writing of the consolidation kernal code can be static or dynamic.

Figure 3:
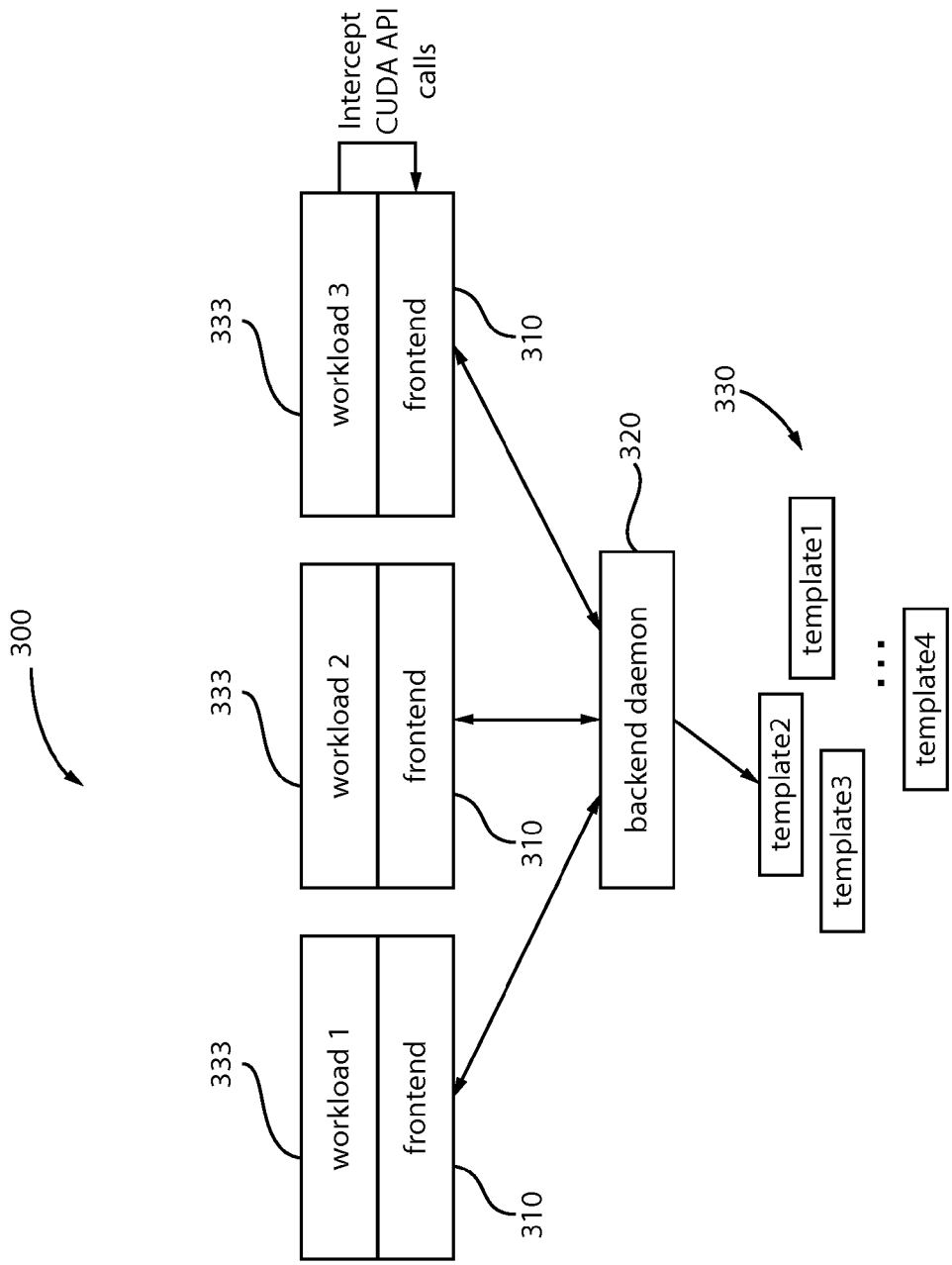
FIG. 3 shows a framework 300 for energy-aware consolidation on a graphics processing unit (GPU), in accordance with an embodiment of the present principles.

FIG. 3 shows a framework 300 for energy-aware consolidation on a graphics processing unit (GPU), in accordance with an embodiment of the present principles. The framework 300 includes three components, namely a front-end (also interchangeably referred to herein as "a call interceptor") 310, a back-end (also interchangeably referred to herein as "a consolidator") 320, and precompiled templates 330. It is to be appreciated that the front-end 310 may include more than one front-end. For example, in one embodiment, there may be one front-end 310 for each workload 333 to be considered for consolidation.

The frontend 310 is a shared library, loaded into applications to intercept specific CUDA API calls. The intercepted CUDA API calls include: (1) GPU memory related operations, such as memory allocation (cudaMalloc) and memory copy (cudaMemcpy); (2) cudaConfigureCall; (3) cudaSetupArgument; and (4) cudaLaunch. The frontend 310 also sets up a communication channel with the backend, through which the frontends inform the backend of API type and arguments.

The backend 320 is a daemon, launched before any workload execution. The backend 320 listens for connection requests from the frontend instances and then communicates with the frontends 310 to receive CUDA API information. It is the backend 320 that really conducts the CUDA API calls and kernel calls.

A precompiled template 330 is a CUDA kernel that implements a specific workload consolidation. Each template 330 corresponds to a type of workload consolidation. Such types of workload consolidation may include, but are not limited to, encryption workloads, Monte Carlo (MC) workloads, and so forth as readily determined by one of ordinary skill in the art. The template 330 is independent of block partitioning between workloads. Therefore, the template 330 is able to handle the workloads which are reused very often but with different grid configurations. For example, one grid configuration may involve 10 thread blocks, each having 4 threads therein. Another grid configuration may involve 4 thread blocks, each having 10 threads therein. Accordingly, in such configurations, the same overall number of threads are used and conceivably the same template can be used and then re-used to serve both of these configurations. Of course, the same configuration itself (e.g., 10 thread blocks, each having 4 threads therein) may repeat from time to time, and hence the same template may service both times. These and other variations are readily contemplated by one of ordinary skill in the art.

The front-end 310, back-end 320, and precompiled templates 330 are described in further detail hereinafter.

Figure 4:
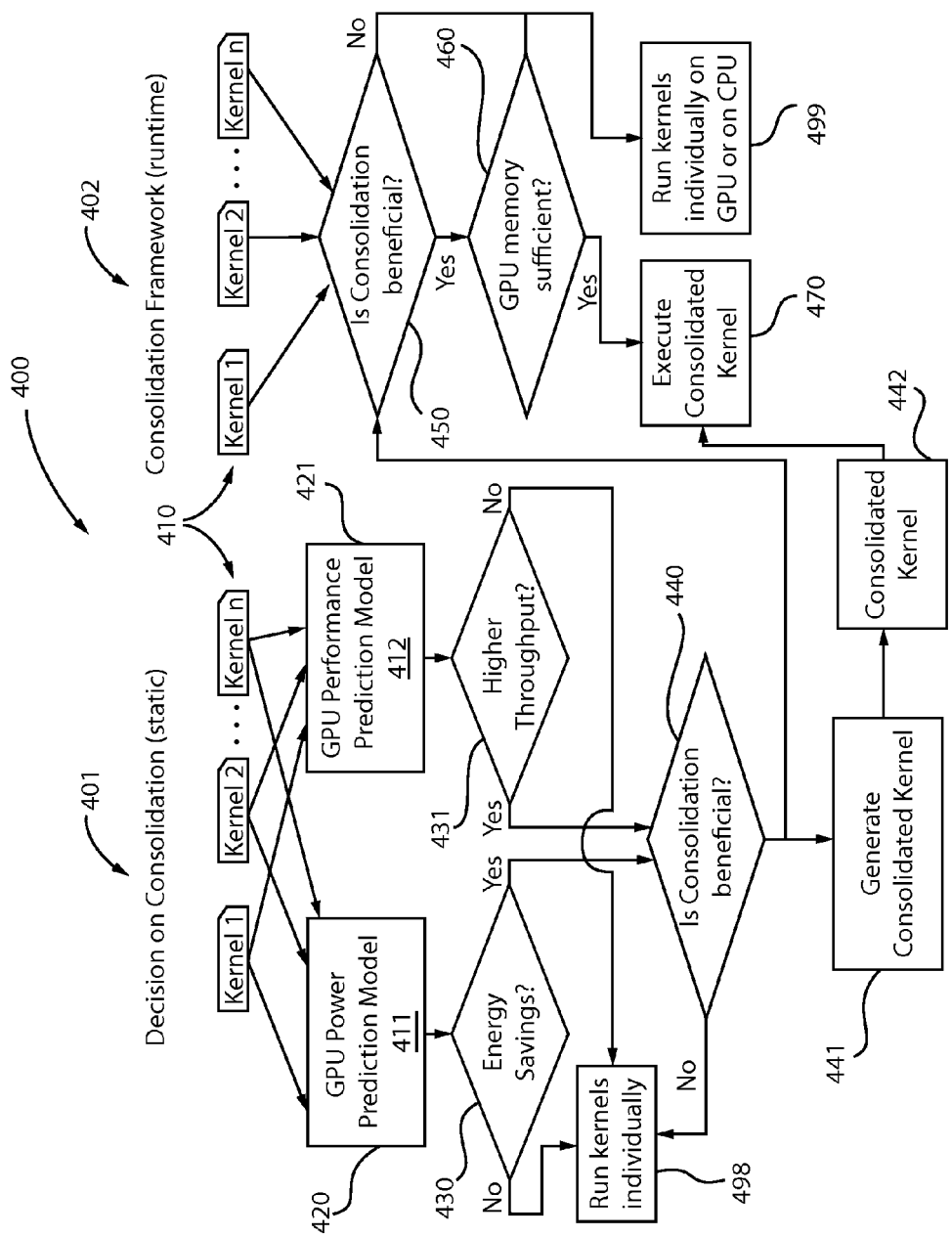
FIG. 4 shows a high-level block diagram of an exemplary system/method 400 for rendering a workload consolidation decision, in accordance with an embodiment of the present principles.

FIG. 4 shows a high-level block diagram of an exemplary system/method 400 for rendering a workload consolidation decision, in accordance with an embodiment of the present principles. The system/method 400 invoices a static approach 401 and a runtime approach 402. Both approaches involves kernal 1 though kernal n (with the kernals collectively denoted by the figure reference numeral 401). It is to be appreciated that while the static approach 401 may be used by itself, using only the static approach 401 results in a number of deficiencies as described herein particularly for an enterprise working environment. Hence, in a preferred embodiment the runtime approach 402 is used. In such a case, the runtime approach 402 can be combined with the static approach 401 for use on, for example, generally repeating enterprise workloads and generally non-repeating workloads, respectively.

The static approach 401 will now be described.

A GPU power prediction model 411 evaluates the kernals 410 at step 420 to generate a power prediction. A GPU performance prediction model 412 evaluates the kernals 410 at step 421 to generate a performance prediction.

The power prediction is provided to a decision block at step 430 to determine whether or not an energy savings exists by executing the consolidated kernals versus executing the kernals 410 separately. If so, then the method proceeds to a step 440. Otherwise, the method proceeds to a step 498.

The performance decision is provided to a decision block at step 431 to determine whether or not a higher throughput is obtained by executing the consolidated kernal versus executing the kernals 401 separately. If so, then the method proceeds to the step 440. Otherwise, the method proceeds to the step 498.

At step 440, it is determined whether or not the consolidation is beneficial. If so, then the method proceeds to a step 441 (and also to step 450 at runtime). Otherwise, the method proceeds to step 498. We note regarding step 440 that, in some embodiments the same can be omitted in view of the two "yes" outputs from steps 430 and 431 which feed step 440. In other embodiments, a recheck or additional criteria may be used to judge whether the consolidation is beneficial. Given the teachings of the present principles provided herein, one of ordinary skill in the art will readily determine additional criteria capable of being used for step 440, while maintaining the spirit of the present principles.

At step 498, the kernals 410 are run (executed) individually.

At step 441, a consolidated kernal 442 is generated.

The runtime approach 402 will now be described.

At step 450, the kernals 410 are evaluated to determine whether or not consolidation is beneficial (i.e., whether or not execution of a consolidated kernal is beneficial over executing the kernals 410 separately). It is to be appreciated that if both the static approach 401 and the runtime approach 402 are used, the evaluation performed at step 450 can simply use the result of the evaluation performed at step 440, presuming no change in the kernal workloads.

If so, then the method proceeds to a step 460. Otherwise, the method proceeds to step 499.

At step 460, it is determined whether or not the GPU has sufficient memory for executing the consolidated kernal. If so, then the method proceeds to step the 470. Otherwise, the method proceeds to the step 499.

At step 470, the consolidated kernal is executed.

At step 499, the kernals are individually executed on a GPU or CPU.

We note that the consolidation determination is applied to two or more kernals at any given time, where the two or more kernals do not necessarily include all the pending kernals, but rather various combinations in order to determine the optimal GPU workload consolidation.

Thus, one key differentiator of the consolidation decision policy is that we decide whether consolidation of kernals achieves energy efficiency and high throughput without the actual execution of the consolidated kernal. Based on the grid and block dimensions of GPU kernal execution, the framework packages kernals. The performance and energy prediction models direct the decision making process of whether to consolidate kernals considering the performance and energy benefits. If an energy benefit is not predicted, then the kernals are either run on the CPU or on the GPU based on the performance of each individual kernal.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

Herein, we show that workload consolidation on GPU is energy efficient and such consolidation cannot be applied for arbitrary workloads. To that end, for illustrative purposes, we use a heterogeneous compute node with two Intel Xeon E5520 quad-core processors and two NIVDIA Tesla C1060 GPUs, each of which has 30 SMs, 4 GB global memory, and a CUDA compute capability 1.3. The code is written with NVIDIA CUDA and executed with CUDA driver and runtime version 3.0. Of course, the present principles may be applied to other configurations as readily determined by one of ordinary skill in the art, while maintaining the spirit of the present principles. The energy here refers to the whole system energy consumption. The performance of a GPU includes the GPU computation time and data transfer time between a host memory and a GPU device memory. The performance of a CPU refers to the CPU time doing the same computation as a GPU. The execution time is the time duration of concurrently running multiple workloads, from the point where all workloads get started to the point where all workloads are finished. Given a fixed number of workloads to execute, this execution time also reflects the system throughput. The smaller the execution time, the larger the system throughput.

Figure 5A:
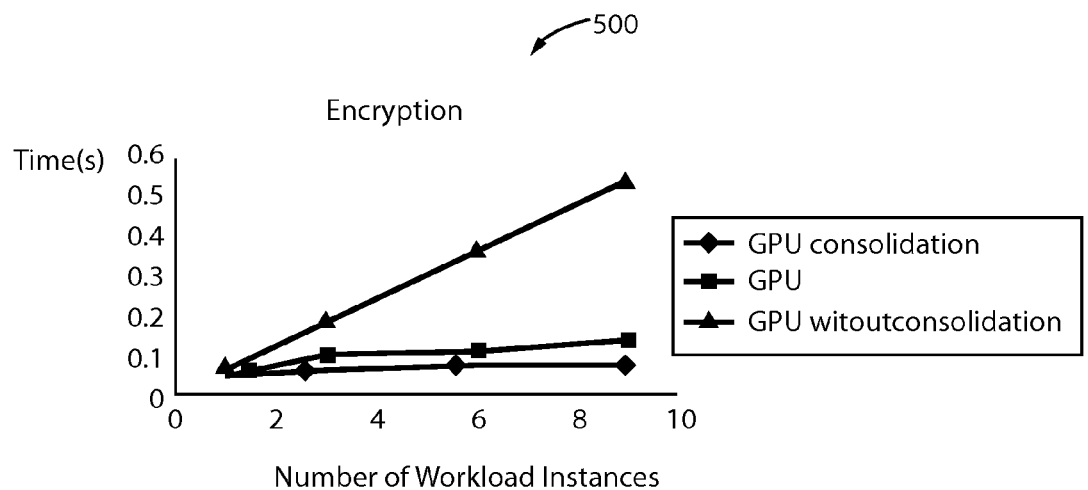
FIG. 5A shows the performance results 500 for an encryption workload, in accordance with an embodiment of the present principles.
Figure 5B:
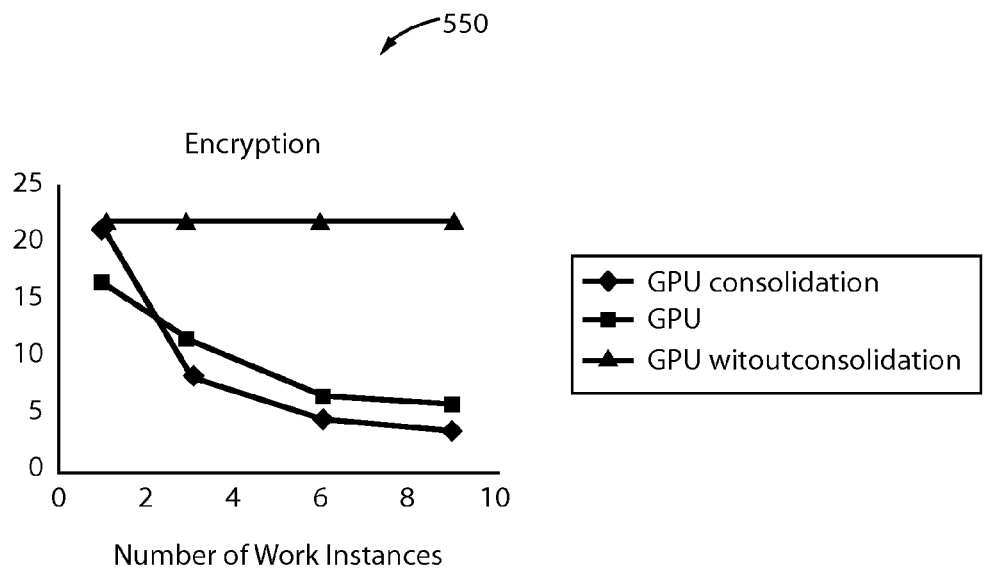
FIG. 5B shows the energy results 550 for the same encryption workload, in accordance with an embodiment of the present principles.

FIG. 5A shows the performance results 500 for an encryption workload, in accordance with an embodiment of the present principles. FIG. 5B shows the energy results 550 for the same encryption workload, in accordance with an embodiment of the present principles. A single encryption workload (using the advanced encryption standard (AES) algorithm) with an input file of 12 KB on a GPU has worse performance (18.33% slower) than on a CPU. The energy consumption of using a GPU in running this workload is 1.52 times more than that of using a CPU, which is not energy efficient. As we consolidate multiple identical encryption workloads (i.e., homogeneous workload consolidation) and inject a single kernel including multiple encryption workloads to a GPU, the GPU performs better than a CPU and the GPU energy efficiency (energy/workload) is improved. In the best cases, the GPU achieves a 68.13% performance improvement with a 28.92% energy saving over a CPU. We also notice that without workload consolidation, the execution time for these workloads increase almost linearly with the number of workloads, while the energy/workload is almost constant.

Further analysis reveals that a single encryption workload has three thread blocks. A GPU scheduler distributes thread blocks between SMs in a round robin fashion and only three SMs are leveraged. As we consolidate more workloads into a GPU, the GPU power consumption is not linearly increased, but rather slowly increased. A recent study also shows that GPU power does not increase linearly as the number of utilized SMs is increased. Execution time as we increase the number of workloads stays relatively stable, because the new workloads get scheduled onto idle SMs and the new workloads do not introduce serious resource contention on the shared resources, such as the GPU global memory, shared memory, and registers. Therefore, the energy consumption, which is the product of power and execution time, decreases significantly. A CPU does not get performance benefits from workload consolidation due to resource sharing, such as L2 and L3 cache misses. In addition, when a processor core is overloaded with multiple workloads, a CPU suffers from context switch overheads due to the operating system's time slicing between workloads. On the other hand, a GPU has less of these performance concerns, because of its very small caches and unique design of scheduling a large number of threads to cover any memory access latency. Without workload consolidation on a GPU, the kernels from workloads are serialized in the CUDA issue queue. Therefore, the execution time is linearly increasing while the energy consumption is constant. Note that even the newest Fermi architecture cannot execute these workloads concurrently, because they come from the different process contexts.

Workload consolidation does not guarantee an increase energy efficiency of GPU. It has been suggested to merge workloads if kernels are underutilizing GPU resources. However, in the following discussion, we show that making consolidation decisions require more than a simple underutilization limitation. We explain this conclusion with the following two consolidation scenarios.

Scenario 1: The consolidation of a single Monte Carlo (MC) workload (45 thread blocks and 50 computation iterations) and a single encryption workload (15 thread blocks and 1.0E+5 computation iterations).

TABLE 1

| Workload | Time (s) | Energy (KJoule) |
|---|---|---|
| Single MC | 62.41 | 25.595 |
| Single encryption | 19.50 | 7.034 |
| MC + encryption | 84.56 | 33.501 |

Scenario 2: The consolidation of a single BlackScholes workload (45 thread blocks and 1000 computation iterations) and a single workload using search GPU kernel (15 thread blocks, 6E+6 computation iterations).

TABLE 2

| Workload | Time (s) | Energy (KJoule) |
|---|---|---|
| Single BlackScholes | 26.45 | 12.220 |
| Single search | 49.23 | 19.228 |
| BlackScholes + Search | 58.73 | 26.721 |

From these two scenarios, we can observe interesting performance results of consolidated workloads. In Scenario 1, the execution time of the consolidated workload (84.56 s) is larger than the sum of the execution times of two (MC and encryption) workloads. We do not see any energy benefit of this workload consolidation. In Scenario 2, the execution time of the consolidated workload (58.73 s) is smaller than the sum of the execution time of two workloads and a little longer than that of the larger workload (i.e., search), which results in an energy savings. Hence, consolidation of all underutilizing kernels does not guarantee energy savings. It is beneficial to have a rigorous analysis based consolidation. We use performance modeling and power modeling to determine the energy efficiency of workload consolidation.

Energy-Aware Workload Consolidation

Referring back to FIG. 3, we further describe our energy-aware consolidation strategy. For a variety of kernels, we first statically evaluate whether consolidation of kernels is energy efficient and achieves higher throughput. We use a GPU performance model to verify potential throughput and a GPU power model to verify the potential for energy savings. If both these goals can be achieved, then we generate consolidated templates of kernels statically. We develop a consolidation framework that uses the consolidated kernels based on GPU computation requests. We select the number of kernels that can be consolidated, and choose the suitable consolidated kernel. The number of kernels is selected based on the required data of the consolidated kernel. In the following sections, we describe the performance model, power prediction model, and the consolidation framework.

We classify workload consolidation scenarios into two categories, taking into consideration how thread blocks are distributed between SMs. The performance model must be able to handle both of them. In the first category, no more than one thread block is scheduled into the same SM. The encryption workload described above is such an example. A single encryption workload uses 3 SMs. Consolidating 6 encryption workloads uses 18 SMs. The thread blocks are not overlapped with each other. For this category, we do not need to consider how the thread blocks are scheduled and the performance model just needs to capture single workload performance and the resource sharing effect (in particular, the global memory bandwidth sharing). In the second category, more than one thread block is scheduled into the same SM. The thread blocks scheduled into the same SM may come from the same workload or different workloads. For this category, the performance model should consider the GPU scheduling strategy, in addition to the concerns of resource sharing effects.

We extend a recent GPU performance analytical model to estimate the performance of a consolidated workload. Our performance model predicts computation time on a GPU. The data transfer time between a CPU and a GPU can simply be estimated based on the data size and memory bandwidth between the host memory and the GPU memory. Our work is a significant extension to the previous performance analytical model. The previous work is based on the implicit assumption that SMs are either idle or executing the same type of workload. This assumption is not true for the consolidated workload where SMs can have different types of computation. In addition, the previous work does not consider scheduling orders of heterogeneous warps scheduled into the same SM, which is an important factor to determine performance. We will first quickly review the previous GPU performance model and then explain our extension.

GPU Performance Analytical Model

The performance model is built upon two important concepts which capture the main performance bottleneck of parallel applications on GPU architectures, namely memory warp parallelism (MWP) and computation warp parallelism (CWP). Since the latency of each memory operation can be hidden by executing multiple memory requests concurrently, MWP represents the number of memory requests that can be serviced concurrently. MWP may be determined by considering the number of running threads and memory bandwidth consumption. CWP is related to the program characteristics. CWP represents how much computation can be done by other warps during one memory access period. That is, CWP represents how much computation can be done by other warps while one warp is waiting for memory values. Based on the degree of MWP and CWP, the model estimates the effective cost of memory requests and then estimates the overall execution time of a GPU kernel.

Some equations to compute execution time are listed in the following. The notations related to our discussion are listed in TABLE 3. The parameters of these equations are determined by static analysis on workload PTX codes and GPU hardware configurations.

If (MWP is N warps per SM) and (CWP is N warps per SM)

$$\left(\text{Mem\_cycles} + \text{Comp\_cycles} + \frac{\text{Comp\_cycles}}{\#\text{Mem\_insts}} \times (MWP-1)\right) \times \#Rep \quad (4)$$

Else if (CWP>=MWP) or (Comp_cycles>Mem_cyles)

$$\left(\text{Mem\_cycles} \times \frac{N}{MWP} + \frac{\text{Comp\_cycles}}{\#\text{Mem\_insts}} \times (MWP-1)\right) \times \#Rep \quad (5)$$

Else (CWP>=MWP)

$$(\text{Mem\_L} + \text{Comp\_cycles} \times N) \times \#Rep \quad (6)$$

TABLE 3

| | |
|---|---|
| Mem_L | Average coalesced/uncoalesced memory access latency |
| Mem_cycles | The processor waiting cycles for memory operations per warp |
| Comp_cycles | The execution time of all instructions per warp |
| N | The number of running warps |
| Freq | Clock frequency of the SM processor |
| Mem_insts | Number of memory instructions per warp |
| #Rep | The number of times that each SM needs to repeat the same set of computation |
| BW_per_warp | Global memory bandwidth per warp |
| Load_byte_per_warp | Number of bytes for each warp |
| #ActiveSM | Number of active SMs |

Performance Modeling for Consolidated Workload

For the first category of consolidated workload, we can first apply the model to each single workload. Assume that the workload i execution time is $t_{wi}$. Then the total execution time (T) of finishing all nw workloads is:

$$T = \max_{i=1}^{nw}(t_{w_i}) \quad (7)$$

In addition, consolidated workloads share global memory bandwidth which has an impact on memory warp parallelism. This is modeled as follows:

$$MWP\_peak\_BW = \frac{\text{Mem\_Bandwidth}}{\sum_{i=1}^{nw}(BW\_per\_warp_i \times \#ActiveSM_i)} \quad (8)$$

$$BW\_per\_warp_i = \frac{Freq \times Load\_bytes\_per\_warp_i}{\text{Mem\_L}} \quad (9)$$

$BW\_per\_warp_i$, $\#ActiveSM_i$ and $Load\_bytes\_per\_warp_i$ are parameters specific for the workload i. Mem_L, which depends on single workload memory access characters and GPU hardware configuration, is not affected by the workload consolidation. CWP for a single workload is not affected by the other workloads either, because CWP is computed by using N, Mem_cycles, Comp_cycles, which are determined by single workload characters.

Figure 6A:
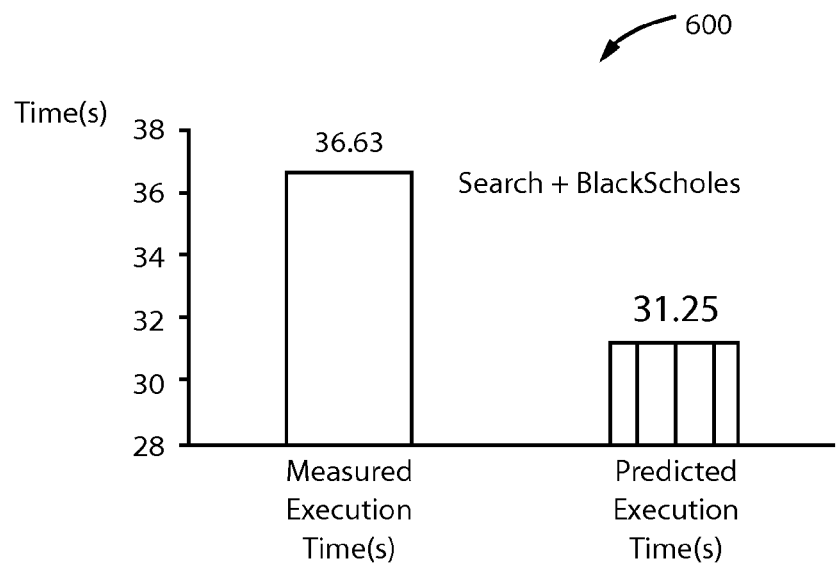
FIG. 6A shows the time prediction accuracy results 600 for a first category of consolidated workloads relating to a search workload (kernal) and a BlackScholes workload (kernal), in accordance with an embodiment of the present principles.
Figure 6B:
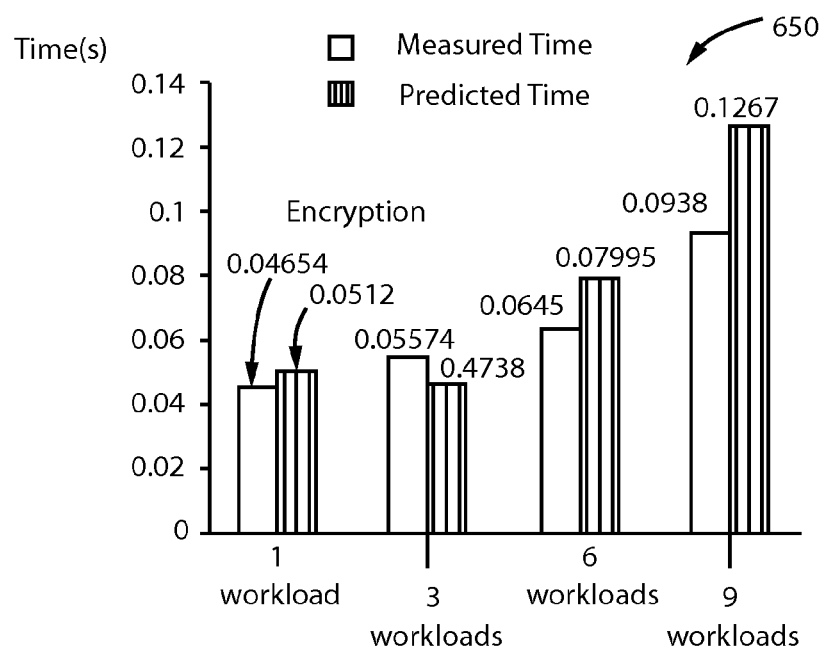
FIG. 6B shows the time prediction accuracy results 650 for the first category of consolidated workloads relating to different encryption workloads, in accordance with an embodiment of the present principles.

We apply our model to two consolidated workloads. FIG. 6A shows the time prediction accuracy results 600 for a first category of consolidated workloads relating to a search workload (kernal) and a BlackScholes workload (kernal), in accordance with an embodiment of the present principles. FIG. 6B shows the time prediction accuracy results 650 for the first category of consolidated workloads relating to different encryption workloads, in accordance with an embodiment of the present principles. The workload configurations are summarized in TABLE 4 (data input size for encryption workload is 12 KB).

For the second category of consolidated workloads, each SM may be assigned with different thread blocks. The final execution is determined by the SM that finishes its workload latest. We call this SM the "critical SM".

Before we apply the performance model to estimate execution time, we need to know how the GPU assigns thread blocks to SMs. To explain why this matters to the performance, we discuss the two scenarios (Scenario 1 and Scenario 2) mentioned herein above.

In the first scenario, we consolidate the two workloads with the encryption workload assigned block ID 0~14 and the MC workload assigned block ID 15~59. The thread blocks are first distributed between SMs using round robin. In particular, each of the first 15 SMs is assigned with 1 encryption block and 1 MC block and each of the second 15 SMs is assigned with 2 MC blocks. Since the encryption workload is much shorter, it is possible that the first 15 SMs finish the encryption workload while the second 15SMs are still assigned with the 2 MC blocks. To balance the workload between the SMs, some Monte Carol (MC) blocks will be redistributed to the first 15 SMs by a GPU scheduler. Therefore, the critical SM, which is one of the first 15SMs, is allocated with 2 MC blocks and one encryption block.

In the second scenario, we consolidate the workloads with the search workload assigned block ID 0~14 and the BlackScholes workload assigned with ID 15~59. At first, each of the first 15 SMs is assigned with 1 search thread block and 1 BlackScholes workload and each of the second 15 SMs is assigned with 2 BlackScholes workload. Each SM executes the warps of the assigned two blocks. The warps from the BlackScholes thread blocks in the first 15 SMs are executed interleaving with the warps from the search workload. Thus, the BlackScholes thread blocks in the first 15 SMs are finished no earlier than any BlackScholes thread blocks in the second 15 SMs. The critical SM in this example, which is one of the first SMs, is allocated with 1 search block and 1 BlackScholes block.

In general, the thread block distribution between SMs depends on the single workload execution times and the load balance principle of the scheduler. Sometimes the thread block distribution can occur in the middle of execution. We can determine the critical SM based on an analysis of the block distribution. Given thread blocks assigned to a SM, we next estimate the time of finishing these assigned blocks. In a GPU architecture, each SM can execute multiple warps in a timesharing fashion. SM schedules warps based on warp type, instruction type, and "fairness" to all warps executing in the SM. To maximize system output, it is possible that each SM interleaves different warps (i.e., the warps belonging to different thread blocks) to improve parallelism. Therefore, we regard different types of thread blocks scheduled into the same SM as one single big block and estimate the execution time based on this big block. In particular, for the critical SM in the example 2, we combine search kernel and BlackScholes kernel to compute Mem_cycles, Comp_cycles, BW_per_warp and CWP. We can further compute MWP by considering memory bandwidth sharing between all SMs. Computing MWP is trivial, because we have transformed the second category of consolidated workload into the first category by the combination of thread blocks. We can use the method for the first category to estimate the execution time of each SM and use Equation (7) to determine the total execution time.

Figure 7A:
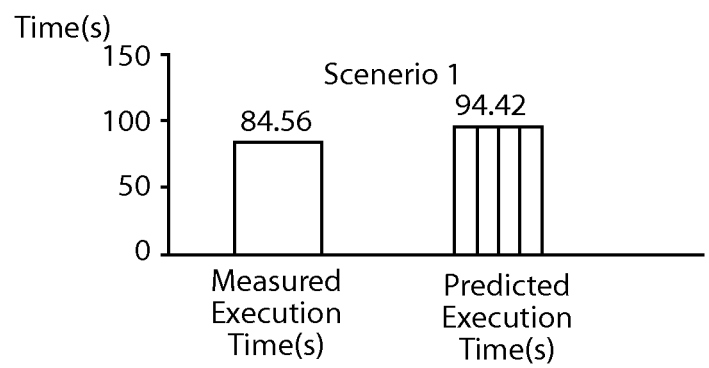
FIG. 7A shows the time prediction accuracy results 700 for a first scenario relating to the second category of consolidated workloads, in accordance with an embodiment of the present principles.
Figure 7B:
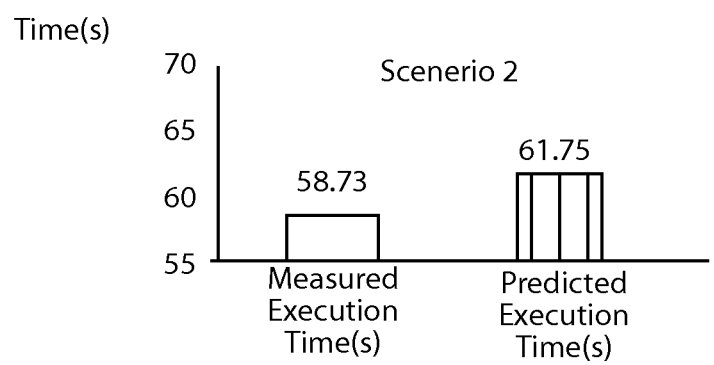
FIG. 7B shows the time prediction accuracy results 750 for a second scenario relating to the second category of consolidated workloads, in accordance with an embodiment of the present principles.

We apply our extended performance model to predict the execution time for the previous two examples. FIG. 7A shows the time prediction accuracy results 700 for a first scenario relating to the second category of consolidated workloads, in accordance with an embodiment of the present principles. FIG. 7B shows the time prediction accuracy results 750 for a second scenario relating to the second category of consolidated workloads, in accordance with an embodiment of the present principles. We found that the predicted time is usually larger than the measured time. A possible explanation for such behavior is that the workloads are unevenly distributed between SMs. Some SMs finish the work earlier and alleviate the memory bandwidth contention, while our model assumes bandwidth sharing always happens.

GPU Power Model

The most recent model for predicting GPU power assumes that there is only one highly data parallel workload running on a GPU. Modeling GPU power for workload consolidation meets several challenges: (1) we must consider the consolidation cases where different SMs are assigned with different workload; (2) the power estimation method should be lightweight, so that it can be leveraged at runtime by the workload consolidation framework; and (3) we must capture the execution properties of the workload and then derive its power consumption without the execution. We described herein how our power model solves these challenges, which separates us from previous work.

GPU power (P) can be modeled by the following:

$$P = P_{static} + P_T(\Delta T) + P_{dyn} \quad (10)$$

where $P_{static}$ is the static power, $P_T$ is the temperature impacts on power and $P_{dyn}$ is the dynamic power. Static power depends on chip layout and circuit technology, which is independent of workload execution. Static power can be measured when no workload is executed and clock gating is not employed. Chip temperature also has an impact on power ($P_T$). The leakage current and thermal voltages for a transistor vary as temperature changes, which in turn leads to leakage power changes. The relationship between the temperature changes ($\Delta T$) and power changes can be estimated by a linear equation. We can obtain the equation coefficients by running training benchmarks. The temperature changes can be estimated by a resistive-capacitive (RC) model, whose parameters are empirically determined by a step function and dynamic power. Dynamic power ($P_{dyn}$) results from transistors switching overhead. It is determined by runtime access rates of specific hardware components (i.e., event rates. For example, accessing floating point unit event rate and accessing global memory event rate). In general, to estimate GPU power, we need to estimate dynamic power while other power contribution factors can be determined independent of the workloads.

We model the GPU dynamic power by the following simple linear equation:

$$P_{dyn} = \sum_{i=1}^{|S|} a_i e_i + \lambda \quad (11)$$

$$e_i = \frac{\text{The number of occurences of the event } i}{\text{execution cycles}} \quad (12)$$

where $P_{dyn}$ is the average dynamic GPU power; the event rate $e_i$ is the access rate of hardware component i in a single SM; $a_i$ and $\lambda$ are the model coefficients. They can be obtained by linear regression using training benchmarks. The $e_i$ is calculated as the dynamic number of instructions divided by execution cycles, based on the fact that GPU does not have speculative execution design. The execution cycles are the GPU clock cycles spent during the execution of workload.

To compute event rates, we need to know the execution cycles and the number of instructions that access specific hardware components. The execution cycles are predicted with the model described herein. We can count the number of instructions by using two methods. The first method uses hardware performance counters. However the limited hardware support in current GPUs is a constraint of this method. In particular, counter information is only available after the application execution. Also, the performance counters do not count texture accesses which could be an important power consumption contributor for some workloads. In addition, the raw values of the performance counters come from multiple SMs. From which SMs the counters are collected is uncontrollable. If the thread blocks are unevenly distributed between SMs, which are commonly met in consolidated workloads, then the performance counters do not indicate the actual number of instructions on the GPU. Therefore, instead of relying on performance counters, we use the second method, counting instructions from PTX (Parallel Thread eXecution) assembly instructions by static analysis. PTX instructions translate nearly one to one with native binary micro-instructions. Without source codes, we can obtain workload's PTX codes from, for example, NVIDIA CUDA text-based cubins or ELF-based cubins by decuda or a recently released tool cuobjdump from NVIDIA.

From PTX instructions, we can calculate event rates for at least 11 architectural units, such as global memory, texture cache, and floating point unit. A power model including all of these events would make static analysis on PTX codes overwhelming. Also, the training phases to obtain the coefficients of all access rates would be tedious. On the other hand, the event rates do not contribute equally to the dynamic power. We set up a power model including all event rates and found that the two events contribute most to the dynamic power (global memory accesses (34.77%) and the total number of instructions (22.62%)). Note that global memory access here refers to real memory transaction operations. For uncoalesced memory access, this may include multiple memory transactions. The remaining nine events contribute only 9.5% to the dynamic power. The intercept coefficient $\lambda$, which is obtained through linear regression, contributes 33.08% to the dynamic power estimation. Therefore, we only count the global memory accesses and number of instructions to estimate power without significantly impacting the estimation accuracy, which saves a lot of modeling overhead. This simplified model is sufficient to take a decision on which workloads to consolidate.

Our power model still meets challenges when we apply the model to the consolidated workloads. For heterogonous workload consolidation, the SMs can have different workloads to execute, which leads to different event rates across SMs. The workload can also be unevenly distributed between SMs. Using the event rates from a specific SM cannot capture the power consumption of the other SMs. In addition, we cannot simply estimate the dynamic power for each SM based on their individual event rates and then add them up to obtain the total dynamic GPU power. We found the sum of all SMs' power is much larger than the real power (e.g., 926.4% prediction error for the consolidation of encryption and MC), which indicates that some power consumption estimated from one SM is in fact consumed by multiple SMs. To solve this power model problem, we assume a "virtual" SM whose event rates are the average event rates of all SMs. We estimate the power based on this virtual SM.

To obtain our linear regression model, we train our power model with 6 GPU benchmarks from the RODINIA benchmark suite (10 GPU kernels) and test our model with 14 workloads, including consolidated workloads (e.g., BlackScholes plus search workloads) and unbalanced workloads (e.g., single encryption workload using 15 SMs). With the current facility, we can only measure the power at the system level. To measure GPU power consumption, we first measure the whole system idle power ($P_{idle}$) which includes the GPU static power ($P_{static}$). Then we measure the average system power ($P_{sys}$) when the GPU is leveraged to run workloads. We fix cooling fans speed inside the machine to eliminate their power effects. We assume that when the GPU is executing the workload, the other system components consume almost the same power as when the system is idle. Therefore, GPU power ($P_T(\Delta T)+P_{dyn}$) can be estimated by ($P_{sys}-P_{idle}$). Our assumption is valid because the major power consumption contributors (CPU, memory, fans, and disk) use almost the same power as when the system is idle. When the GPU is executing workloads, the processor which supports clock gating will be placed into a low power state that consumes almost the same power as the idle state. The memory and disk do not consume extra power either, because both of them are not used for the execution of GPU workloads. The prediction error rates for the model verification results (not shown) in all cases are no larger than 10.10% and achieve 6.39% in average.

Workload Consolidation Framework

We consolidate multiple workloads at the granularity of thread blocks. In particular, two or more kernels from multiple workloads are executed by the sum of the number of blocks each kernel requests. Multiple workloads can be executed in parallel, if their blocks are mapped to different SMs. Multiple workloads can also be interleaved at the block level, if their corresponding blocks are scheduled into the same SM. We do not consolidate the workload at the thread level to avoid violating the SIMD lockstep execution of threads in the same warp by inserting control flow divergence. In addition, workload consolidation is not feasible under certain situations, if the consolidated workload breaks the limitation of shared resources, such as the number of registers and shared memory provided to each SM.

The current NVIDIA GPU and CUDA provide very limited support for running multiple kernels on a GPU. Before the newest Fermi GPU architecture, multiple kernels are not allowed to be launched into the GPU at the same time. Even with the Fermi architecture, at most 16 kernels from the same process contexts are allowed to be launched into the GPU. As mentioned earlier, Fermi requires that multiple kernels to be initiated by the same context run simultaneously. Herein, we present the method of consolidating multiple kernels (i.e., workloads) without the constraints of GPU and CUDA. In particular, the number of workloads for consolidation is not restricted, if they do not break the limitation of shared resources (i.e., the consolidated kernels do not have to come from the same process context). We present two methods to facilitate workload consolidation.

Static Workload Consolidation

The static workload consolidation requires modification to the kernel source code. The static workload consolidation includes three steps. The first step involves combining initialization codes, including memory allocation, memory copy between global memory and host memory, and application specific algorithms. Prevent name collisions by renaming variables. Make sure the shared resource conflict does not happen. The second step involves updating the indexes for data accesses, so that using offsets to access memory are still valid for all threads. The third step involves a block distribution between SMs by using block IDs and if-else clauses. Recompile the code as a single big kernel.

The static workload consolidation does not introduce any runtime overhead, although it requires many efforts of rewriting the codes. The static workload consolidation is good for the type of workload that does not reuse very often. For the enterprise working environment, the same type of workload may be repeatedly launched into a GPU many times with the only difference being execution configuration and memory allocation. Using the static workload consolidation method to handle these cases would be very overwhelming. Hence, we design a framework to facilitate dynamic workload consolidation.

Dynamic Workload Consolidation

Referring back to FIG. 3, the dynamic workload consolidation framework can be considered to include three parts, namely: (1) a front-end 310; (2) a backend 320; and (3) precompiled templates 330.

When a memory operation CUDA API is called from the workload, the front-end 310 intercepts it and passes the API arguments to the backend 320. The backend 320 carries on the API operations and returns the results (e.g., a pointer pointing to the allocated memory region). For the memory copy operations (either from host memory to device global memory, or vice versa), the backend 320 cannot directly copy data between the frontend process context and the device global memory, because the backend 320 and the frontend 310 have different process contexts. The backend 320 needs to copy the data into a local pre-allocated buffer first, and then copy the data from the pre-allocated buffer to the destination.

We want the frontend 310 to be independent of the workload implementation, so that the frontend can be easily used by any workload without changes. To do this, the frontend 310 does not intercept workload kernel calls. Instead, the front-end 310 intercepts CUDA driver API calls, including the following: (1) cudaConfigureCall, where the backend can obtain the execution configuration, such as block and grid dimensions; (2) cudaSetupArgument, where the backend can obtain argument information for the workload kernel calls; and (3) cudaLaunch, where the frontends 310 inform the backend 320 of launching the template. The backend 320, after receiving the kernel call arguments from all workloads, will combine them and generate new arguments for the template. Note that since all memory operations are conducted by the backend 320, the kernel call arguments are completely valid in the context of the backend 320.

Although the framework provides the flexibility of combining workloads, it introduces overhead which is not seen in the static workload consolidation. The overhead comes from the memory copy operations between the frontends and the backend pre-allocated buffer, the communication costs between the frontends 310 and the backend 320, and synchronization costs between multiple frontends 310. We introduce several optimizations to reduce or offset the overhead.

To reduce communication costs and synchronization costs, we introduce coordination between frontends 310 for homogeneous workload consolidation. In particular, if all workloads have the same execution configurations and memory requests, we ask them to randomly select a leader. Then the single leader, instead of multiple workloads, communicates with the backend 320. We can also enforce application specific optimization in the backend 320. For example, the AES encryption algorithm needs to load a substitution box and modular multiplication tables, which are large amount of constants to provide the non-linearity in the cipher. Copying these data between the frontend and the backend, and well as between the host memory and GPU global memory, introduce significant overhead. To avoid the expensive copy operations, we ask the backend 320 to preload these constants and copy them to GPU global memory just once where they are then reused by multiple workloads. This optimization even introduces performance improvement over the static workload consolidation. There are other possible optimizations to reduce communication costs. For example, to transfer the kernel call arguments from the frontend to the backend 320, instead of transferring them one by one whenever cudaSetupArgument is intercepted, we can ask the frontend 310 to keep them until cudaLaunch is triggered. This optimization reduces the number of communications between the frontend 310 and backend 320, which is the most significant overhead for small workload consolidation.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method, comprising:
    configuring a shared library, stored in a memory, to be loaded into applications to intercept graphics processing unit (GPU) computation requests for different types of workload kernals corresponding to the applications;
    generating a power prediction and a performance prediction for at least one candidate kernel combination for execution on a GPU responsive to the GPU computations requests, the at least one candidate kernel combination pertaining to at least two of the workload kernals; and
    rendering a decision of whether to execute the at least one candidate kernel combination or to execute the at least two of the workload kernals pertaining thereto separately, based on the power prediction and the performance prediction.

2. The method of claim 1, wherein the GPU computation requests comprise application programming interface calls.

3. The method of claim 1, further comprising statically writing the at least one candidate kernel combination.

4. The method of claim 3, further comprising generating a plurality of precompiled templates, each being configured to implement a respective one of a plurality of workload consolidation types, and wherein a given one of the plurality of precompiled templates is selected and used to statically write the at least one candidate kernel combination from the at least two workload kernals.

5. The method of claim 4, wherein the plurality of precompiled templates are configured to be independent of a block partitioning between the workload kernals.

6. The method of claim 1, further comprising dynamically writing the at least one candidate kernel combination.

7. The method of claim 1, wherein the power prediction is a measure of an energy consumption of the GPU with respect to an execution of the at least one candidate kernel combination.

8. The method of claim 7, wherein the power prediction is based on a number of global memory accesses to be performed and a number of instructions to be executed with respect to the execution of the at least one candidate kernel combination.

9. The method of claim 7, wherein the GPU comprises a plurality of streaming multiprocessors, and the performance prediction is based on scheduling orders of heterogeneous warps that are scheduled into a same one of the plurality of streaming multiprocessors.

10. The method of claim 1, wherein the performance prediction is a measure of a processing throughput of the GPU with respect to an execution of the at least one candidate kernel combination.

11. The method of claim 10, wherein the GPU comprises a plurality of streaming multiprocessors, and the performance prediction is selectively determined with respect to a first and a second workload consolidation category, the first workload consolidation strategy being that only one thread block is scheduled into a same one of the plurality of streaming multiprocessors, the second workload consolidation strategy being that more than one thread block is scheduled into the same one of the plurality of streaming multiprocessors.

12. The method of claim 10, wherein the GPU comprises a plurality of streaming multiprocessors, and wherein the performance prediction is based on an amount of shared global memory bandwidth between the plurality of streaming multiprocessors with respect to the execution of the at least one candidate kernel combination.

13. The method of claim 10, wherein the performance prediction is based on a memory warp parallelism and a computation warp parallelism with respect to the execution of the at least one candidate kernel combination.

14. The method of claim 13, wherein the memory warp parallelism is determined based on a number of running threads and a global memory bandwidth consumption with respect to the execution of the at least one candidate kernel combination.

15. The method of claim 13, wherein the computation warp parallelism is determined based on a number of running warps, GPU waiting cycles for memory operations per warp, and an execution time of all instructions per warp with respect to the execution of the at least one candidate kernel combination.

16. The method of claim 1, wherein the workload kernals belong to different contexts.

17. The method of claim 1, wherein the applications are compute unified device architecture (CUDA) applications.

18. The method of claim 1, wherein the power prediction is determined by capturing execution properties of an execution of the at least one candidate kernel combination, and deriving a power consumption of the execution without actually performing the execution.

19. A system, comprising:
a call interceptor having a memory, the memory having a shared library stored therein, the shared library configured to be loaded into applications to intercept graphics processing unit (GPU) computation requests for different types of workload kernals corresponding to the applications;
a consolidator configured to generate a power prediction and a performance prediction for at least one candidate kernel combination for execution on a GPU responsive to the GPU computations requests, the at least one candidate kernel combination pertaining to at least two of the workload kernals,
wherein a decision is provided by said consolidator of whether to execute the at least one candidate kernel combination or to execute the at least two of the workload kernals pertaining thereto separately, based on the power prediction and the performance prediction.

20. The system of claim 19, wherein the workload kernals belong to different contexts.

* * * * *